US008687225B2

(12) United States Patent
Tao et al.

(10) Patent No.: US 8,687,225 B2
(45) Date of Patent: Apr. 1, 2014

(54) MEMORY MANAGEMENT DURING SIMPLEX AND DUPLEX PRINTING WITH AN IMAGE FORMING APPARATUS

(75) Inventors: Kozo Tao, Osaka (JP); Norifumi Miyahara, Osaka (JP)

(73) Assignee: KYOCERA Document Solutions Inc. (JP)

( * ) Notice: Subject to any disclaimer, the term of this patent is extended or adjusted under 35 U.S.C. 154(b) by 311 days.

(21) Appl. No.: 13/358,085

(22) Filed: Jan. 25, 2012

(65) Prior Publication Data

US 2012/0188577 A1    Jul. 26, 2012

(30) Foreign Application Priority Data

Jan. 26, 2011    (JP) .................................. 2011-013966

(51) Int. Cl.
    G06K 15/00    (2006.01)
(52) U.S. Cl.
    USPC ......................................... 358/1.16; 358/1.14
(58) Field of Classification Search
    CPC ..... G03G 15/234; G03G 15/50; G06K 15/00;
        G06K 15/1817; G06K 15/1861; G06K
        2215/0005; G06K 2215/0014; G06K
        2215/0062; H04K 2203/0066; H04L 12/43;
        H04L 12/6418; H04L 2012/5612; H04L
        2012/5662; H04L 2012/6437; H04L
        2012/6456; H04L 2012/6467; H04L
        2012/6483; H04L 2012/6486; H04L
        2012/6489; H04L 2012/6497; H04N 1/32358;
        H04N 1/40; H04N 1/41; H04N 2201/0082;
        H04N 2201/0094; H04N 2201/3288; H04N
        2201/3295; H04Q 11/0478
    USPC .............................................. 358/1.14, 1.16
See application file for complete search history.

(56) References Cited

U.S. PATENT DOCUMENTS

| 6,865,188 B1* | 3/2005 | Stirling et al. ................ 370/460 |
| 2001/0040699 A1* | 11/2001 | Osawa et al. ................ 358/1.17 |
| 2008/0018933 A1* | 1/2008 | Ozawa et al. ................ 358/1.16 |
| 2010/0189458 A1* | 7/2010 | Miyahara ........................ 399/82 |
| 2010/0231931 A1* | 9/2010 | Tao ................................ 358/1.6 |
| 2011/0058191 A1* | 3/2011 | Tokumoto ...................... 358/1.9 |

FOREIGN PATENT DOCUMENTS

| JP | 2004-312242 | 11/2004 |
| JP | 2007-245703 | 9/2007 |

* cited by examiner

*Primary Examiner* — Fred Guillermety
(74) *Attorney, Agent, or Firm* — McDonnell Boehnen Hulbert & Berghoff LLP

(57) ABSTRACT

An image forming apparatus includes a rendering processing unit for generating rendering data by sequentially performing a rendering process on units of printing data corresponding to a job and storing the rendering data in a first area, an image processing unit for generating image data by sequentially performing an image process on units of rendering data in the page unit and storing the image data in a second area, an output control unit for outputting the image data in an order, and a memory full detection unit for detecting, if the output of subject units of the image data is incomplete when a specific time elapses since the rendering process on the subject units of the job is completed and only a part or all of the subject units of the image data are stored in the second area, that an image data storage amount exceeds an acceptable amount.

18 Claims, 6 Drawing Sheets

MEMORY MANAGEMENT DURING SIMPLEX AND DUPLEX PRINTING WITH AN IMAGE FORMING APPARATUS

REFERENCE TO RELATED APPLICATIONS

This application is based upon and claims the benefit of priority from the corresponding Japanese Patent Application No. 2011-013966, filed in the Japan Patent Office on Jan. 26, 2011, the entire contents of which are incorporated herein by reference.

BACKGROUND

1. Technical Field

The present disclosure relates to an image forming apparatus that performs a printing control by utilizing a storage area of a memory, in particular, an image forming apparatus that correctly detects an excess of a data storage amount in the storage area to aim for stability during printing.

2. Description of the Related Art

In recent years, in an image forming apparatus such as a printer or a copier, a resolution and a gradient tend to be increased along with an increase in an image quality of a job.

On the basis of the above-mentioned technological trend, a typical image forming apparatus uses temporarily stored image data in a preliminary step to aim for smoothness in a printing process.

For example, in a procedure of an image process, various storage areas such as an area for temporarily storing input data, an area for temporarily storing compressed data after the image process, an area for temporarily storing image data for a printing of multiple copies exist and are utilized.

Then, through an attempt to mutually utilize these respective storage areas, a capacity shortage can be compensated for, but a problem of a memory shortage cannot be fundamentally solved.

For this reason, an image forming apparatus is proposed in which when memory full state indicating that a data storage amount exceeds an acceptable amount occurs, the state is resolved and the printing process can continue.

In other words, with regard to the image forming apparatus, an emphasis is put on a countermeasure after the memory shortage is caused in actuality, and with this arrangement, an influence from the memory full state is substantially avoided.

Here, a detection method for the memory full state that is adopted in a typical image forming apparatus will be described.

For example, in a case where a simplex printing is carried out with a copy function on the basis of a plurality of sheets of originals, first, an original reading unit consecutively takes in originals and receives scan images. Subsequently, the received image data is subjected to an image process such as a color conversion process for each band, and the generated image data is stored. Then, once the image data for one page is accumulated, the image data is output in accordance with a linear speed of a printing engine. When the output of the image data for one page is completed, the image data in a video buffer is deleted.

The second page and subsequent pages are sequentially stored in a free space created by deleting the image data after the output of the previous page. Once the image data for one page is accumulated, the image data is output to the printing engine.

In a case where the simplex copy is carried out, if the output is not completed within a specific period of time after the start of the image process of a subject page, it is determined that the memory full state has occurred.

To be more specific, in the video buffer, a period of time during which only the image data of one page is stored is measured by a timer. In a case where this storage state continues for a specific period of time and timeout then occurs, the memory full state is detected.

It should be noted however that with regard to the original of the first page, since reading of the image data can be carried out instantly irrespective of a size or a content of the original document, if the output is not completed within a specific period of time after the start of the intake of the original document, it is determined that the memory full state has occurred.

However, the above-mentioned detection method for the memory full state may cause the following state.

First, in a case where a sheet feeding error occurs because of an engagement of an original document fed from an original tray with sheet feeding rollers or the like, the original reading unit repeatedly performs the process until the intake of the original document is succeeded. In a case where copying of the first page of the original document is carried out, a timer for detecting the memory full state is activated in accordance with the start of the original intake. For this reason, the time elapses while the intake of the original document is repeatedly carried out, and an erroneous detection that the memory full state has occurred in the video buffer may be carried out in some cases.

Also, with regard to printing data corresponding to a job sent from a personal computer or the like, a case in which the data amount is markedly high (for example, a long printing or the like) or a case in which the data amount is markedly low (for example, a character printing or the like) exists, and therefore rendering process times have variations.

For this reason, according to the method in related art in which a reference of the timeout is set as the job reception start time, the memory full state may not be correctly detected in some cases.

Furthermore, according to the method of detecting the memory full state in a case where a state in which only the image data of one page is stored in the video buffer continues for a specific period of time, the memory full state may not be correctly detected in some cases also at the time of a duplex printing.

In the duplex printing, after one face of the sheet is printed, it is necessary to guarantee the output of the image data to the printing engine from the video buffer when the other face is printed. For this reason, the image data is output after at least the image data for two pages corresponding to the front face and the rear face is stored in the video buffer.

According to the above-mentioned method, among the image data for the two pages corresponding to the front face and the rear face, after the first page is stored in the video buffer, even if the memory full state occurs when the remaining page is stored, the state in which only the image data for one page is stored in the video buffer is not established. For this reason, the memory full state may not be correctly detected in some cases.

SUMMARY

An image forming apparatus according to an embodiment of the present disclosure is provided with a rendering processing unit, an image processing unit, an output control unit, and a memory full state detection unit. The rendering processing unit is configured to generate rendering data by sequentially performing a rendering process on one or more units of printing data corresponding to a received job and store the rendering data in a first storage area. The image processing unit is configured to generate image data by sequentially performing an image process on one or more units of rendering data stored in the first storage area and store the image data in a second storage area. The output control unit is configured to output the image data stored in the second storage area in a specific order. The memory full state detection unit is configured to detect, in a case where the output of subject units of the image data is not completed even when a specific period of time elapses since a state is established in which the rendering process on the subject units of the job is completed and also only a part or all of the subject units of the image data are stored in the second storage area, that a storage amount of the image data in the second storage area exceeds an acceptable amount. A unit of printing data, and a unit of rendering data, is a page.

A non-transitory computer-readable recording medium according to an embodiment of the present disclosure stores an image forming program executed by a computer of an image forming apparatus. The image forming program includes first to fourth program codes. The first program code causes the computer to generate rendering data by sequentially performing a rendering process on one or more units of printing data corresponding to a received job and store the rendering data in a first storage area. The second program code causes the computer to generate image data by sequentially performing an image process on one or more units of rendering data stored in the first storage area and store the image data in a second storage area. The third program code causes the computer to output the image data stored in the second storage area in a specific order. The fourth program code causes the computer to detect, in a case where the output of subject units of the image data is not completed even when a specific period of time elapses since a state is established in which the rendering process on the subject units of the job is completed and also only a part or all of the subject units of the image data are stored in the second storage area, that a storage amount of the image data in the second storage area exceeds an acceptable amount. A unit of printing data, and a unit of rendering data, is a page.

An image forming method according to an embodiment of the present disclosure includes (i) generating, by a rendering processing unit, rendering data by sequentially performing a rendering process on one or more units of printing data corresponding to a received job and storing the rendering data in a first storage area, (ii) generating, by an image processing unit, image data by sequentially performing an image process on one or more units of rendering data stored in the first storage area and storing the image data in a second storage area, (iii) outputting, by an output control unit, the image data stored in the second storage area in a specific order, and (iv) detecting, by a memory full state detection unit, in a case where the output of subject units of the image data is not completed even when a specific period of time elapses since a state is established in which the rendering process on the subject units of the job is completed and also only a part or all of the subject units of the image data are stored in the second storage area, that the storage amount of the image data in the second storage area exceeds the acceptable amount. A unit of printing data, and a unit of rendering data, is a page.

Additional features and advantages are described herein, and will be apparent from the following Detailed Description and the figures.

DETAILED DESCRIPTION

Hereinafter, embodiments of the present disclosure will be described with reference to the drawings.

Figure 1:
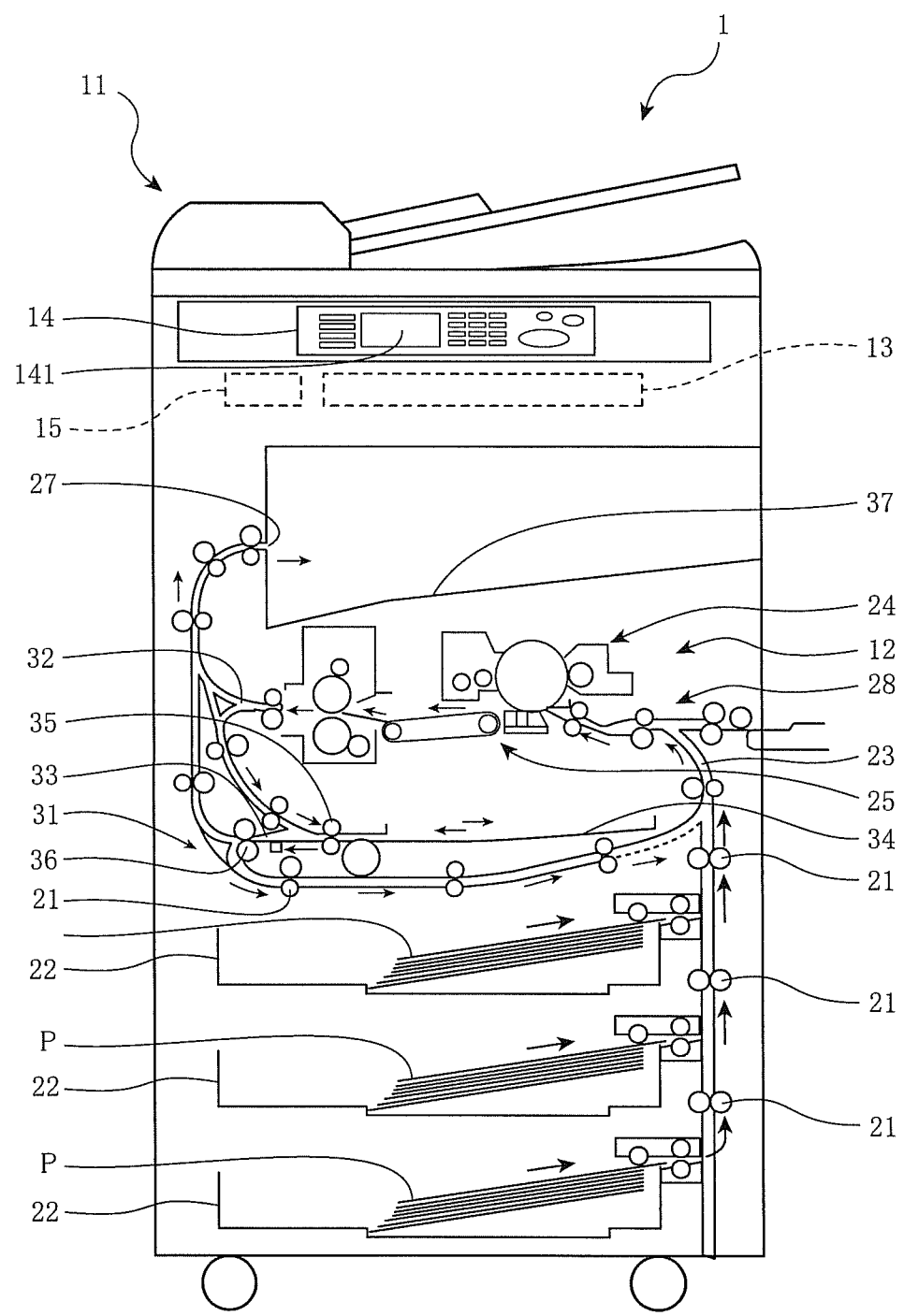
FIG. 1 illustrates an internal configuration of an image forming apparatus according to an embodiment of the present disclosure.

FIG. 1 illustrates an internal configuration of an image forming apparatus according to an embodiment of the present disclosure.

As illustrated in FIG. 1, an image forming apparatus 1 according to the present embodiment is a multifunctional printer (MFP) having a copy function and a printer function and is provided with original reading unit 11, printing unit 12, control unit 13, an operation unit 14, and communication interface 15.

Original reading unit 11 has a mechanism configured to read an original document and is provided on an upper part of image forming apparatus 1.

Original reading unit 11 feeds an original set in an original tray in accordance with an operation of a user. Original reading unit 11 conveys the original document to an original reading position via a conveyance path formed therein to read an image on the original document through an operation of a built-in scanner apparatus.

It should be noted that original reading unit 11 has an original intake-retry function for attempting to reattempt the intake of an original document if the feeding of the original document fails for a specific number of time (for example, 5 times).

Printing unit 12 has a mechanism configured to print image data on a sheet P and is provided inside image forming apparatus 1. Printing unit 12 prints on the sheet P the image of the original document read by the scanner apparatus of original reading unit 11 or an image related to print data that is transmitted from a terminal apparatus such as a personal computer connected to image forming apparatus 1 so as to be communicable with each other.

To be more specific, printing unit 12 performs a printing process on the sheet P conveyed from sheet feeding cassette 22 by using printing engine 24.

Printing engine 24 performs a charging process, an exposure process, and a development process to form an image development on a photosensitive drum. For example, in a case where a full-color printing is carried out, corresponding toner images of respective planes of cyan (C), magenta (M), yellow (Y) and black (K) are formed on the photosensitive drum. After that, a printing process is carried out on the sheet P through a transfer process by transfer unit 25 and a fixing process by fixing unit 26.

While sheet conveyance unit 28 rotates conveyance rollers 21, the sheet P contained in sheet feeding cassette 22 is conveyed along sheet conveyance path 23 formed inside image forming apparatus 1, and the sheet P is supplied to printing engine 24. Also, sheet conveyance unit 28 discharges the sheet P on which the printing is completed from discharge outlet 27 to discharge tray 37.

Also, sheet conveyance unit 28 is provided with reversing unit 31 configured to reverse the sheet P for the duplex printing.

Reversing unit 31 is provided with branch section 32, a sheet conveyance path 33 for the duplex printing, intermediate tray 34, switch back mechanism 35, and sheet reversing mechanism 36. Branch section 32 is arranged between a section on a sheet discharge side of fixing unit 26 and discharge outlet 27, and guides the sheet P to sheet conveyance path 33 for the duplex printing of reversing unit 31. Intermediate tray 34 is arranged in a middle of sheet conveyance path 33 for the duplex printing and temporarily accumulates one sheet P guided by branch section 32. Switch back mechanism 35 inverts the conveyance direction of the sheet P accumulated in intermediate tray 34 and guides the sheet P to sheet conveyance path 33 for the duplex printing again. Sheet reversing mechanism 36 reverses the face of the sheet P guided again to sheet conveyance path 33 for the duplex printing by through switch back mechanism 35 and supplies the sheet P to printing engine 24. The reversed sheet P is supplied to printing engine 24, and as a result, the duplex printing can be carried out in which the printing is conducted on both the front face and the rear face of the sheet P.

It should be noted that other configurations for duplex printing similar to reversing unit 31 can also be employed.

Reversing unit 31 is provided with a reversal mechanism to aim for not only a normal duplex printing in which the duplex printing is carried out for each sheet, but also a high-speed duplex printing in which the duplex printing is carried out in parallel on a plurality of sheets P. Sheet conveyance unit 28 supplies the sheet P from sheet conveyance path 23 to printing engine 24 and reverses the sheet P after printing by reversing unit 31 to be thereafter supplied from sheet conveyance path 23 to printing engine 24 again, so that the duplex printing is executed. If the above-mentioned conveyance procedure is carried out for each sheet, the normal duplex printing is executed. If the conveyance procedure is carried out for the plurality of sheet P in parallel, the high-speed duplex printing is executed.

Control unit 13 is configured to control the respective units of image forming apparatus 1 including original reading unit 11 and printing unit 12. Control unit 13 is provided inside image forming apparatus 1.

Operation unit 14 is provided in a front panel part of image forming apparatus 1 and is provided with a button for a user to operate image forming apparatus 1 (for example, a start button for starting copying or the like) and display panel 141.

Display panel 141 is an apparatus composed of a liquid crystal panel configured to display various messages and the like. Display panel 141 can display a message informing of a memory full error that will be described below. Display panel 141 may be composed of a touch panel for displaying a button for the user to operate image forming apparatus 1.

Communication interface 15 is provided inside image forming apparatus 1 and is provided with a communication circuit configured to connect image forming apparatus 1 with the terminal apparatus so that each is communicable with each other. To be more specific, communication interface 15 may take the form of a network interface, a memory interface, a parallel port interface, or the like.

Figure 2:
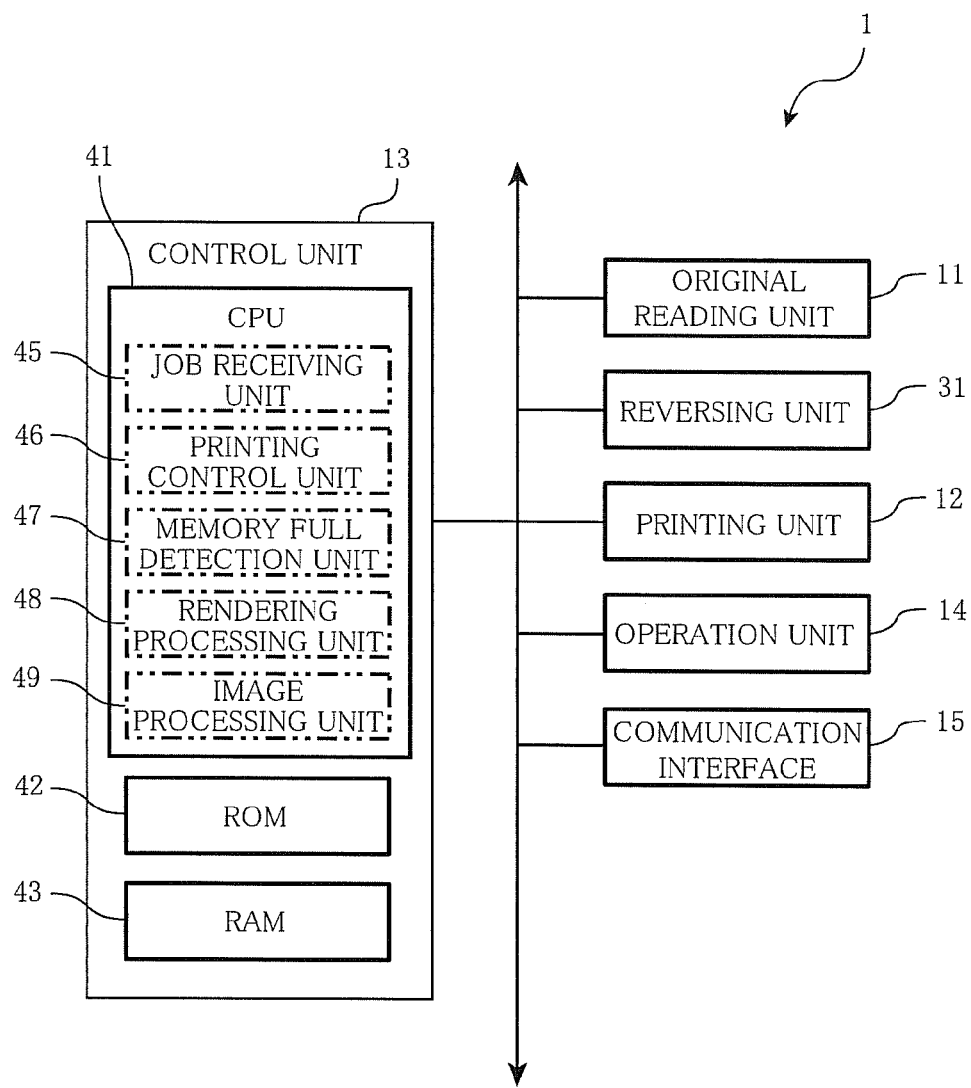
FIG. 2 illustrates a configuration of the image forming apparatus according to the embodiment of the present disclosure.

FIG. 2 illustrates a configuration of the image forming apparatus according to the embodiment of the present disclosure.

As illustrated in FIG. 2, in image forming apparatus 1, original reading unit 11, printing unit 12, control unit 13, operation unit 14, communication interface 15, and reversing unit 31 are mutually connected.

Control unit 13 is provided with CPU (Central Processing Unit) 41, ROM (Read Only Memory) 42, and RAM (Random Access Memory) 43. ROM 42 stores a computer program that causes control unit 13 to operate as job receiving unit 45, printing control unit 46, memory full detection unit 47, rendering processing unit 48, and image processing unit 49 which will be described below. CPU 41 reads out this computer program from ROM 42 and executes the read computer program to cause control unit 13 to operate as job receiving unit 45, printing control unit 46, memory full detection unit 47, rendering processing unit 48, and image processing unit 49. RAM 43 is used as a working memory at a time when CPU 41 executes this computer program.

Job receiving unit 45 receives a job from original reading unit 11 while the user operates operation unit 14 or a job transmitted from a terminal apparatus via communication interface 15. The job includes setting information defining how the printing is carried out (for example, setting information related to the simplex printing or the duplex printing, enlargement, reduction, color conversion, and the like), a rendering command, and printing data equivalent to an image. The job includes a simplex printing job and a duplex printing job.

The simplex printing job is a job for printing one face of the sheet P, that is, a job for printing only the front face.

The duplex printing job is a job for printing both faces of the sheet P, that is, a job for printing the front face and the rear face.

Printing control unit 46 controls printing unit 12 and reversing unit 31 after a job is received by receiving unit 45 (the simplex printing job or the duplex printing job). With respect to the simplex printing job, printing control unit 46 performs simplex printing control for printing on one of the faces of the sheet P. During simplex printing control, printing control unit 46 operates printing unit 12 but does not operate reversing unit 31. On the other hand, with respect to the duplex printing job, printing control unit 46 performs duplex printing control for printing on both the faces of the sheet P. During duplex printing control, printing control unit 46 operates both printing unit 12 and reversing unit 31.

Memory full detection unit 47 detects an occurrence of a memory full state.

Rendering processing unit 48 performs a rendering process, that is, rasterizing of the printing data corresponding to the job received by job receiving unit 45 to generate rendering data.

Image processing unit 49 performs an image editing process such as a color conversion process on the rendering data to generate image data.

Here, a configuration of control unit 13 according to the present embodiment will be described.

Figure 3:
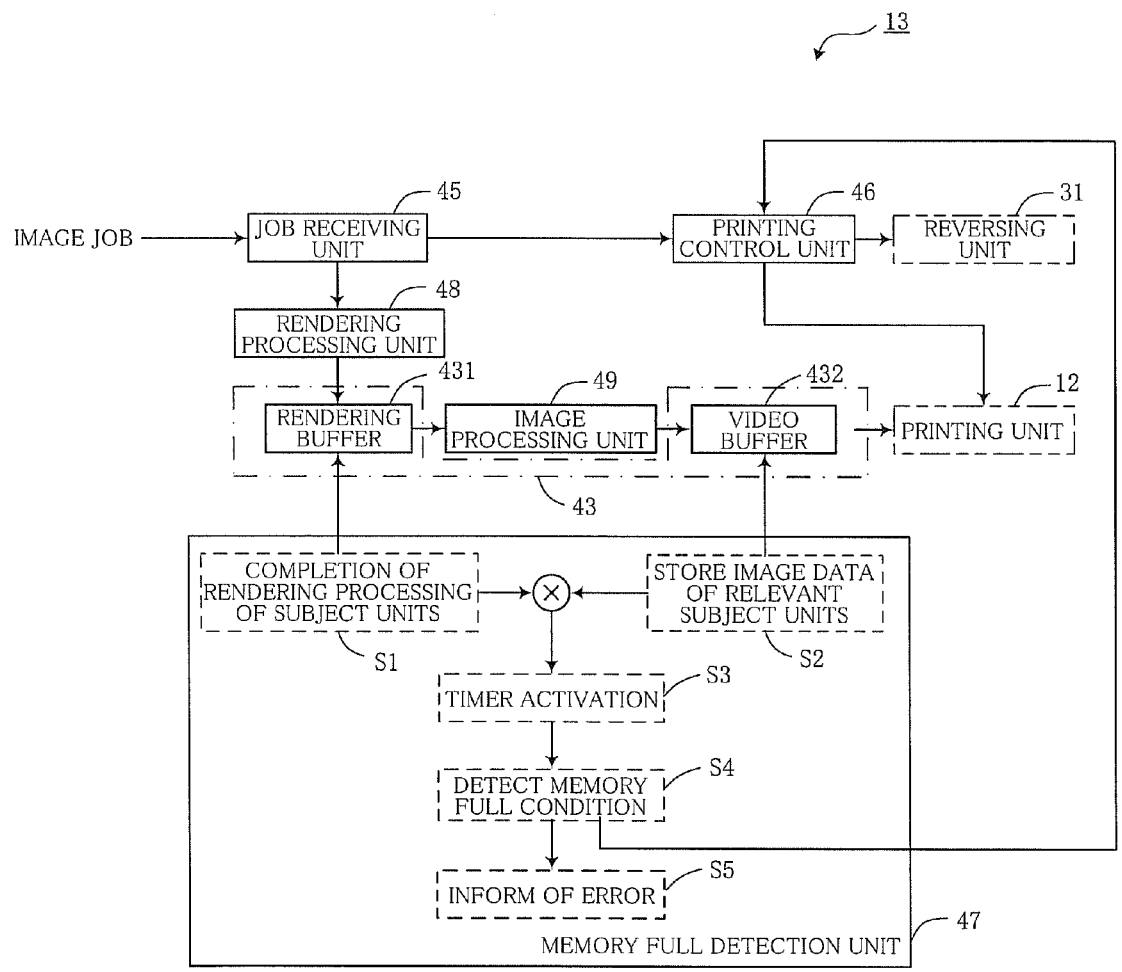
FIG. 3 illustrates a configuration of a control unit according to the embodiment of the present disclosure.

FIG. 3 is a configuration of control unit 13 according to the embodiment of the present disclosure.

RAM 43 is provided with rendering buffer (first storage area) 431 where the rendering data obtained by performing the rendering process on the printing data corresponding to the job received by job receiving unit 45 is stored and video buffer (second storage area) 432 where the image data obtained by performing the image process on the rendering data as data storage areas.

Rendering processing unit 48 performs sequentially the rendering process on the printing data corresponding to the job received by job receiving unit 45 to generate rendering data. To be more specific, rendering processing unit 48 performs the rasterizing of the page of the processing subject of the printing data and sequentially transfers the rendering data obtained through a compression function into a coded format such as JPEG (Joint Photographic Experts Group) including YUV format for color values to rendering buffer 431. The transferred rendering data is sequentially stored in rendering buffer 431.

Image processing unit 49 takes out rendering data corresponding to a page in which the rendering process is completed from rendering buffer 431 to perform the image editing process such as the color conversion process. Upon the color conversion process, image processing unit 49 derives CMY data on the basis of the YUV format included in the rendering data and further converts this data into CMYK data so that image data of an output format is generated.

Image processing unit 49 repeatedly performs a process of generating band data obtained by dividing the rendering data for one page in the band unit as the image data and also sequentially transferring the generated pieces of band data to video buffer 432. At this time, image processing unit 49 compresses the respective pieces of band data to be transferred to video buffer 432. The transferred image data is sequentially stored in video buffer 432.

Printing control unit 46 outputs the image data stored in video buffer 432 to printing unit 12. After the band data is accumulated in video buffer 432 and the image data for one page or more is assembled, printing control unit 46 outputs the image data to printing unit 12 in accordance with the linear speed of printing unit 12. Since a free space is secured in video buffer 432 while the image data is output, image processing unit 49 starts to generate the image data (band data) for a page to be output next.

In this manner, storage, output, and deletion of the image data (band data) with respect to the storage area allocated as video buffer 432 are repeatedly carried out to correspond to a consecutive printing process of the job. It should be noted that printing control unit 46 controls reversing unit 31 at the time of the duplex printing.

Memory full detection unit 47 detects the occurrence of the memory full state that indicates a state in which the storage amount of the image data exceeds an acceptable amount of video buffer 432. The memory full state occurs in a case where the size of the compressed image data exceeds the capacity of video buffer 432 because the image data is too large, the compression rate is too low, or the like. When the memory full state occurs, since an image process on subject units (one page or a plurality of pages of the printing data can be set as a subject unit) stops in mid-course, at least a part of the subject units of the image data is not stored in video buffer 432. Therefore, the subject units of the image data are not output to printing unit 12 at the time of the occurrence of the memory full state.

To be more specific, as illustrated in FIG. 3, while a first condition is set in which the rendering process is completed with respect to the subject units of the job (S1) and a second condition is set in which a part or all of the image data corresponding to the relevant subject units is stored in video buffer 432 (S2), memory full detection unit 47 measures a period of time since both the first condition and the second condition are satisfied with a timer (S3). If the output of the image data is not completed within a specific period of time, memory full detection unit 47 determines that the memory full state has occurred (S4). It should be noted that the subject unit means a constituent unit of data having a specific number of pages that becomes the subject of the process.

In this manner, by adding "the rendering process completion of the subject unit" as the condition for detecting the occurrence of the memory full state, even if an error occurs at the time of the intake of the job such as an original sheet feeding error in the original tray, it is possible to avoid a failure of erroneously detecting the occurrence of the memory full state.

Also, even if the printing data having variations in rendering process times is processed, it is possible to correctly detect the occurrence of the memory full state.

Furthermore, when the occurrence of the memory full state is detected and the printing process cannot continue, memory full detection unit 47 displays an error message on a display panel of the operation unit, informing of the memory full error (S5).

In this manner, while the user is informed of the occurrence of the memory full state, in a case where the printing is interrupted because of the memory full state, the printing process is cancelled, and also a countermeasure such as deletion of the data of the job that is the cause of the interruption can be promptly carried out in an appropriate manner.

Also, a secondary disturbance such as the stopping of another job process or another function because of the memory full error is smoothly solved, and it is also possible to prevent occurrence of the above-mentioned failure.

Next, a description will be given of a flow of data while being classified into the simplex printing and the duplex printing according to the present embodiment.

1. [Simplex Printing]

Figure 4:
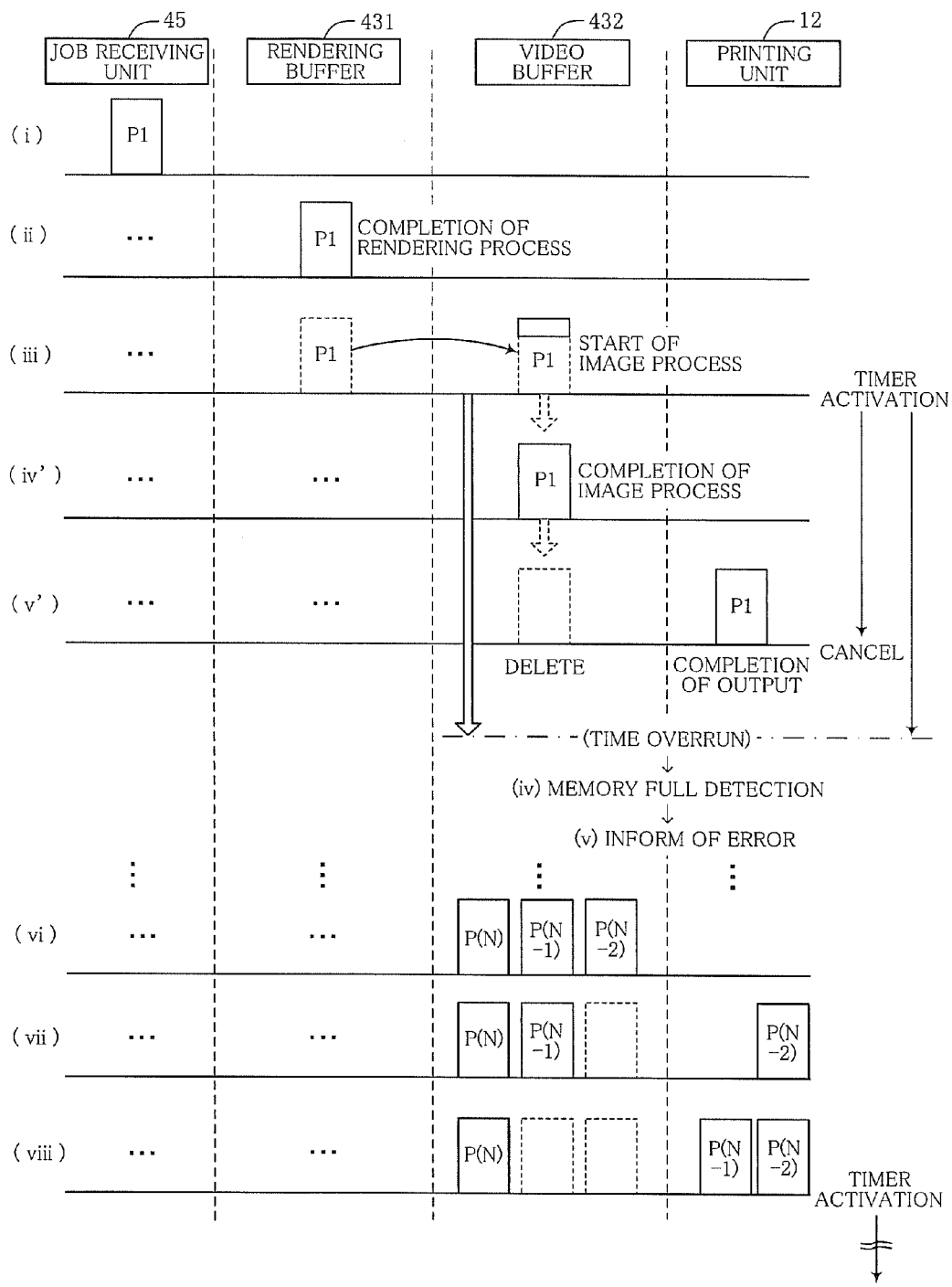
FIG. 4 illustrates a flow of data related to a simplex printing according to the embodiment of the present disclosure.

FIG. 4 illustrates a flow of data related to the simplex printing according to the embodiment of the present disclosure. Herein, in FIG. 4, P1, P(N), P(N−1), and P(N−2) indicate page numbers of printing data corresponding to the simplex printing job.

As illustrated in FIG. 4, when job receiving unit 45 receives first page P1 of the printing data (i), rendering buffer 431 stores the rendering data obtained while rendering processing unit 48 subjects the printing data to the rendering process. When the rendering process of first page P1 is completed, all the rendering data of first page P1 is stored in rendering buffer 431 (ii).

When the rendering process of the subject unit of the simplex printing job (in this case, first page P1 of the printing data) is completed, the first condition is satisfied.

Next, the image process is carried out for each band with respect to the rendering data in rendering buffer 431. The image data obtained through the image process is sequentially transferred to video buffer 432. Video buffer 432 stores the transferred image data (iii).

At this time, since a page preceding first page P1 does not exist, video buffer 432 stores only first page P1. Therefore, a state is established in which a part of the subject units of the image data are stored in video buffer 432, and the second condition is satisfied.

Then, when the first condition and the second condition are both satisfied, the memory full detection unit activates a timer to start a time keeping process (iii). It should be noted that if the rendering process is not conducted, the image process is not carried out, and therefore the memory full detection unit substantially activates the timer at timing when the second condition is satisfied.

After the start of the time keeping process, if the output of the image data of first page P1 to printing unit 12 is not completed within a specific period of time, the memory full detection unit detects the occurrence of the memory full state in video buffer 432 (iv) and informs the user of the memory full error (v).

On the other hand, if the image process of first page P1 is completed within a specific period of time (iv') and the output of the image data of first page P1 to printing unit 12 is completed, the memory detection unit cancels the time keeping process of the timer. After the image data of first page P1 is output to printing unit 12, the image data of first page P1 is deleted from video buffer 432 (v').

With regard to the second page and subsequent pages too, the subject unit of the process is set as one page, and the process is similarly carried out as in the case of first page P1.

For example, in a case where an arbitrary subject page is set as an N-th page P(N), a state in which the rendering process of the N-th page P(N) is completed is set as the first condition, and a state in which only the N-th page P(N) is stored in video buffer 432 is set as the second condition. When these two conditions are both satisfied, the memory full detection unit starts the time keeping process. Even when the specific period of time elapses since the start of the time keeping process, the memory full detection unit detects the occurrence of the memory full state in a case where the output of the image data of the N-th page P(N) to printing unit 12 is not completed and informs a user of the memory full error.

Normally, since the linear speed of printing unit 12 is lower than the speed of the image process, the image data of a plurality of pages may be stored in video buffer 432 in some cases. For example, as illustrated in (vi) of FIG. 4, a case is conceivable in which the image data of the (N−2)-th page P(N−2), the image data of the (N−1)-th page P(N−1), and the image data of the N-th page P(N) are stored in video buffer 432 at the same time. In this case, it is assumed that the rendering process and the image process of the (N−2)-th page P(N−2), the (N−1)-th page P(N−1), and the N-th page P(N) are completed. Therefore, the memory full detection unit already satisfies the first condition at this time point.

In this case, first, the image data of the (N−2)-th page P(N−2) is output (vii), and subsequently, the image data of the (N−1)-th page P(N−1) is output (viii), and when a state is established in which only a part or all of the image data of the N-th page P(N) is stored in video buffer 432, the second condition is satisfied. In (viii) of FIG. 4, since a state is established in which all of the image data of the N-th page P(N) is already stored in video buffer 432, the second condition is satisfied. The memory full detection unit activates the timer at this timing to start the time keeping process. The image data of the N-th page P(N) in which the image process is already completed is instantly output to printing unit 12, and the output is completed within a specific period of time. In that case, the memory detection unit cancels the time keeping process of the timer.

Even if the output of the image data of the (N−2)-th page P(N−2) and the (N−1)-th page P(N−1) is completed, when the image data of the N-th page P(N) is not fully stored in video buffer 432, the remaining image data of the N-th page P(N) cannot be transferred to video buffer 432. For this reason, since the image data of the N-th page P(N) cannot be output to printing unit 12, even when the specific period of time elapses after the start of the time keeping process, the output of the image data of the N-th page P(N) is not completed. In this case, memory full detection unit 47 detects the occurrence of the memory full state in video buffer 432 and informs a user of the memory full error.

As described above, with the image forming apparatus according to the present embodiment, the occurrence of the memory full state at the time of the simplex printing is correctly detected, and a user can be informed of the relevant state.

2. [Duplex Printing]

FIGS. 5A to 5E are explanatory diagrams for describing the normal duplex printing control and the high-speed duplex printing control. Herein, numerals in FIGS. 5A to 5E indicate page numbers of the printing data composed of ten pages. In examples of FIGS. 5A to 5E, in the page order, the printing is carried out on the front page on odd pages and on the rear face on the even pages, and five sheets of the duplex printing product are generated.

Figure 5:
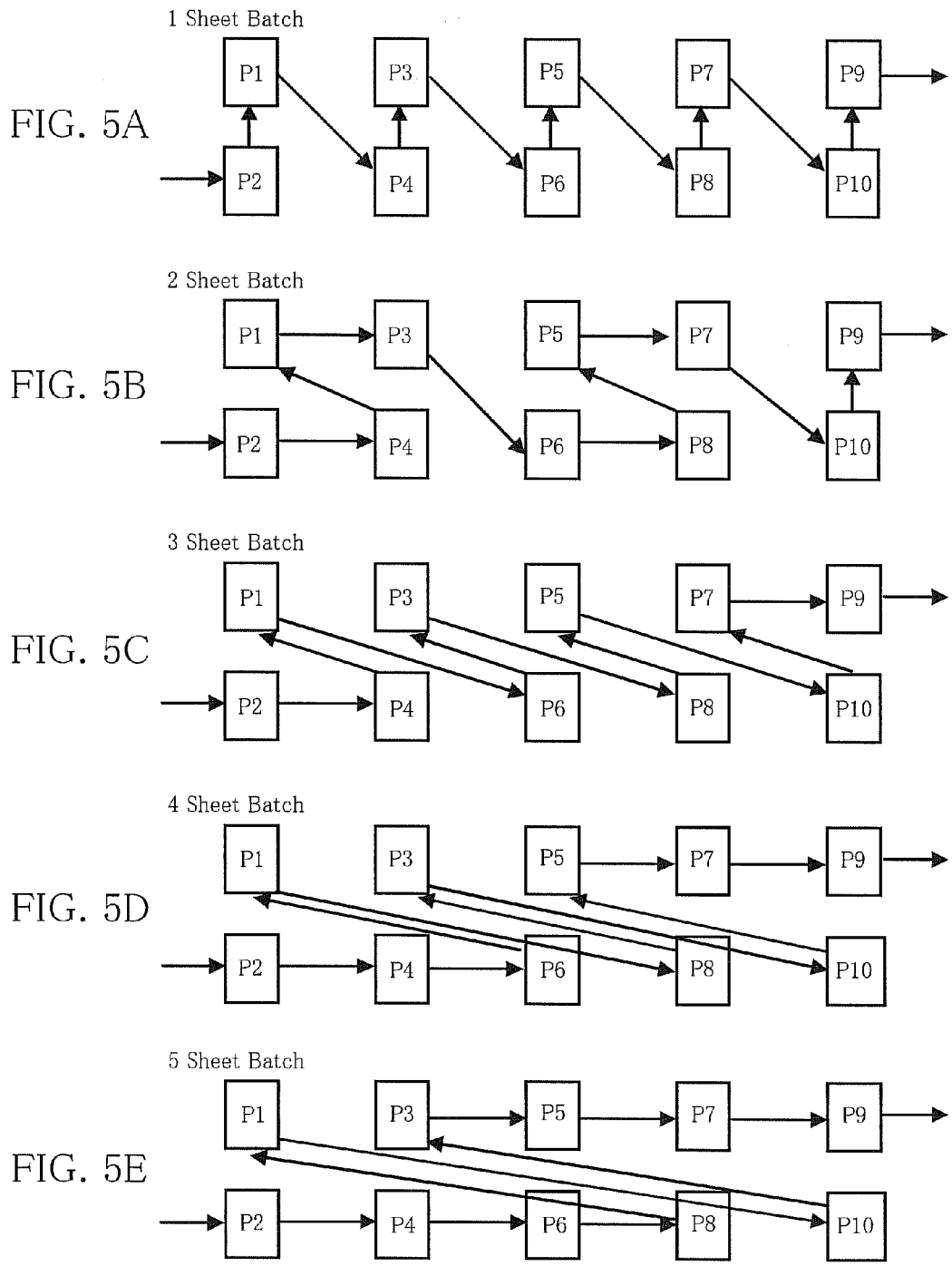
FIGS. 5A to 5E are explanatory diagrams for describing a normal duplex printing control and a high-speed duplex printing control.

FIG. 5A illustrates a normal duplex printing control example called "1 Sheet Batch". The image data is printed in the order of P2→P1→P4→P3→P6→P5→P8→P7→P10→P9 in the order of the rear face and the front face for each sheet.

Subsequently, the face of a sheet to be printed first will be described as a prior printing face, and the face of the sheet to be printed after the prior printing face will be described as a subsequent printing face. In the above-mentioned example, the rear face of the sheet becomes the prior printing face, and the front face becomes the subsequent printing face.

FIGS. 5B to 5E illustrate high-speed duplex printing control examples. FIG. 5B is referred to as "2 Sheet Batch", and the image data is printed in the order of P2→P4→P1→P3→P6→P8→P5→P7→P10→P9. FIG. 5C is referred to as "3 Sheet Batch", and the image data is printed in the order of P2→P4→P1→P6→P3→P8→P5→P10→P7→P9. FIG. 5D is referred to as "4 Sheet Batch", and the image data is printed in the order of P2→P4→P6→P1→P8→P3→P10→P5→P7→P9. FIG. 5E is referred to as "5 Sheet Batch", and the image data is printed in the order of P2→P4→P6→P8→P1→P10→P3→P5→P7→P9. During high-speed duplex printing, in any of FIGS. 5B to 5E, after the prior printing face of a plurality of sheets is printed, during a period in which the sheet is reversed, by carrying out a parallel operation of printing an unprinted face of the other sheet, the increase in the speed of the duplex printing is addressed.

During duplex printing, after the prior printing face is printed, a necessity of guaranteeing an output of the image data from the video buffer to the printing unit when the subsequent printing face is printed is needed. If the video buffer causes the memory full state by the image data of the page corresponding to the subsequent printing face after the prior printing face is printed, the printing on the subsequent printing face cannot be carried out. In particular, in the high-speed duplex printing, if the image data corresponding to the prior printing face of the plurality of pages to be printed first is stored in the video buffer in priority, a space for storing the image data of the page corresponding to the subsequent printing face (for example, the first page) may disappear in some cases. In that case, it is not possible to carry out the printing on the subsequent printing face of the sheet where the prior printing face is printed.

Therefore, in a case where the duplex printing is carried out, the video buffer stores the image data while the two pages of the prior printing face and the subsequent printing face of the sheet are set as one subject unit. When the band data is transferred to the video buffer and the storage of the image data for the two pages or more is completed, the image data is output in accordance with the linear speed of the printing unit. First, the image data of the prior printing face of the first sheet is output to the printing unit and deleted from the video buffer.

Next, the image data of the subsequent printing face is output to the printing unit and deleted from the video buffer.

The image processing unit transfers the image data of the prior printing face and the subsequent printing face that is the subject unit of the next process to the free space of the video buffer. When the output of the image data of the previous subject unit is completed, since the free space is created in the video buffer, the image processing unit can start the transfer of the image data to the video buffer at least at this timing.

The printing control unit selects the normal duplex printing control or the high-speed duplex printing control during a period between the printing process of the prior printing face and the printing process of the subsequent printing face depending on how many of subject units of the next and subsequent image data are stored in the video buffer. The printing control unit controls the reversing unit and the printing unit on the basis of the selected control method.

For example, in a case where only all the image data of one subject unit, that is, the image data for the two pages of the prior printing face and the subsequent printing face is stored in the video buffer, the printing control unit performs the normal duplex printing control of "1 Sheet Batch" illustrated in FIG. 5A. In a case where the image data of not only a certain subject unit but also the two pages of the next subject unit is stored in the video buffer, the printing control unit performs the high-speed duplex printing control of "2 Sheet Batch" illustrated in FIG. 5B. In a case where the number of the subject units stored in video buffer 432 after the image process is completed is 3, the high-speed duplex printing of "3 Sheet Batch" illustrated in FIG. 5C can be carried out. In a case where the number of the subject units is 4, the high-speed duplex printing of "4 Sheet Batch" illustrated in FIG. 5D can be carried out. In a case where the number of the subject units is 5, the high-speed duplex printing of "5 Sheet Batch" illustrated in FIG. 5E can be carried out.

The image data for how many pages to be stored in the video buffer varies depending on the size of the image data and the compression rate. The printing control unit can control the printing process by changing the normal duplex printing and the high-speed duplex printing on the basis of a situation of the image data stored in the video buffer.

Next, with reference to FIG. 6, a flow of data related to the duplex printing according to the embodiment of the present disclosure will be described. Herein, in FIG. 6, P1 to P4 indicate page numbers of the printing data corresponding to the duplex printing job.

Figure 6:
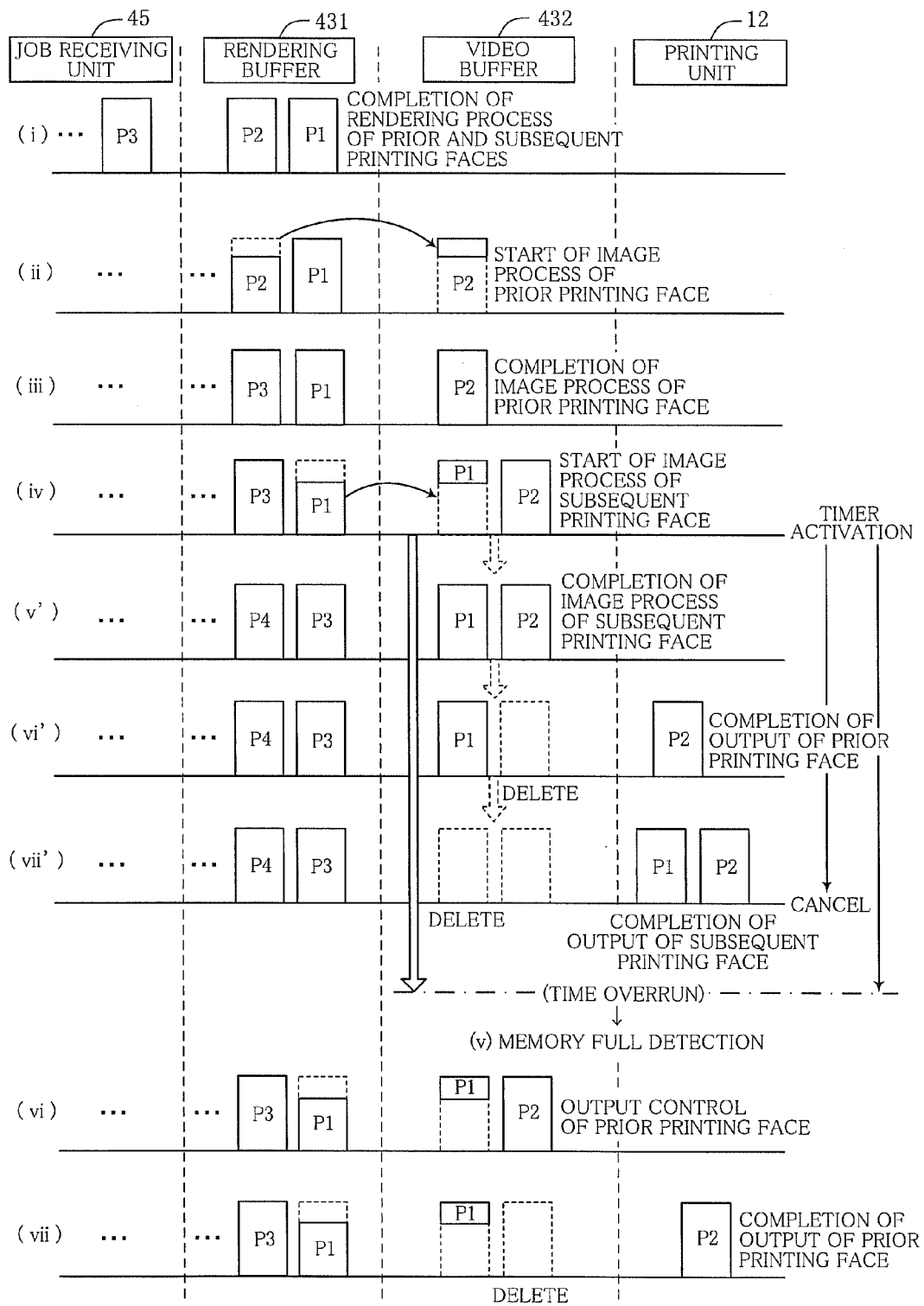
FIG. 6 illustrates a flow of data related to a duplex printing according to the embodiment of the present disclosure.

As illustrated in FIG. 6, when job receiving unit 45 receives the duplex printing job, the rendering process is carried out in the order of received pages. Rendering buffer 431 stores the rendering data obtained by subjecting the printing data to the rendering process. When the rendering process of subsequent printing face P1 and the rendering process of prior printing face P2 are completed, subsequent printing face P1 and prior printing face P2, that is, all the rendering data constituting the subject units is stored in rendering buffer 431 (i).

When the memory full detection unit completes the rendering process on the two pages of the subject units in the duplex printing (in this case, prior printing face P2 and subsequent printing face P1), the first condition is satisfied. In actuality, since the rendering process is carried out in the order that the pages are received by job receiving unit 45, the rendering process of prior printing face P2 is carried out after the rendering process of subsequent printing face P1. For this reason, it is set to a state in which the rendering process of prior printing face P2 is completed as the first condition.

Next, as being different from the order of the rendering process, first, the image process is started from prior printing face P2 (ii). When the image process of prior printing face P2 is completed (iii), next, the image process on subsequent printing face P1 is started (iv).

The image process is carried out for each band with respect to the rendering data in rendering buffer 431, and the image data obtained through the image process is sequentially transferred to video buffer 432. Video buffer 432 stores the transferred image data (ii). At this time, since no page preceding prior printing face P2 exists, only the image data of prior printing face P2 is stored in video buffer 432. Therefore, a state is established in which only a part of the subject units of the image data are stored in video buffer 432, and the second condition is satisfied.

Then, the memory full detection unit activates the timer when the first condition and the second condition are both satisfied to start the time keeping process (iv). It should be noted that, since the image process is not carried out if the rendering process is not conducted, the timer in the memory full detection unit is substantially activated when the second condition is satisfied.

After the start of the time keeping process, if the output of the image data of prior printing face P2 and subsequent printing face P1 corresponding to the subject unit is not completed within a specific period of time, the memory full detection unit detects the occurrence of the memory full state in video buffer 432 and informs the user of the memory full error (v).

On the other hand, if the output of the image data of prior printing face P2 and subsequent printing face P1 is completed within a specific period of time, the time keeping process of the timer is cancelled. In detail, when all of the image data of prior printing face P2 and subsequent printing face P1 is stored in video buffer 432 within a specific period of time (v'), the output of the image data of prior printing face P2 is completed (vi'), and the output of the image data of subsequent printing face P1 is completed (vii'), the time keeping process of the timer is cancelled. The image data of prior printing face P2 and subsequent printing face P1 is output to printing unit 12 and deleted from video buffer 432 (vii').

The memory full detection unit cancels the time keeping process of the timer if the output of the image data of the prior printing face and the subsequent printing face is completed within a specific period of time from the timer activation. It should be noted that only the output completion of the subsequent printing face can also be set as a trigger of the timer cancellation.

The duplex printing process is carried out on the next subject unit, that is, prior printing face P4 and subsequent printing face P3 similarly as in prior printing face P2 and subsequent printing face P1 that are the previous subject unit.

For example, when a state is established in which the image data of prior printing face P4 is stored in video buffer 432, if a state is established in which the image data of the previous subject unit is already deleted from video buffer 432, a part of the next subject unit is stored in video buffer 432. At this time, the second condition is satisfied.

Also, when a state is established in which the image data of prior printing face P4 is stored in video buffer 432, the previous subject unit may remain in video buffer 432. In this case, in the memory detection unit, after the previous subject unit is output to printing unit 12 and deleted from video buffer 432, the second condition is satisfied.

When the image data of the previous subject unit is deleted from video buffer 432, it is also conceivable that the image process on subsequent printing face P3 of the next subject unit is being carried out or completed. At this time, all the image data of prior printing face P4 and a part or all of the image data of subsequent printing face P3 are stored in video buffer 432.

During duplex printing, since the subject unit is composed of the prior printing face and the subsequent printing face, a state is established in which only a part or all of the next subject unit is stored in video buffer 432. At this time, the second condition is satisfied.

When the second condition is satisfied, the first condition is also satisfied. Therefore, when the second condition is satisfied, the memory full detection unit starts the time keeping process. After the start of the time keeping process, if the output of the image data of the next subject unit, that is, prior printing face P4 and subsequent printing face P3 is completed within a specific period of time, the memory full detection unit cancels the time keeping process of the timer. On the contrary, after the start of the time keeping process, if the output of the next subject unit is not completed within a specific period of time, the memory full detection unit detects the occurrence of the memory full state and informs the user of the memory full error.

During duplex printing, in a case where the memory full state occurs, as in the following manner, the subject unit is temporarily set as one page and the printing process may continue.

As illustrated in FIG. 6, when the occurrence of the memory full state of subsequent printing face P1 is detected, the memory full detection unit outputs a specific notification signal to the printing control unit. At this time, the image process on prior printing face P2 is completed, and all the image data of prior printing face P2 is stored in video buffer 432. When the printing control unit receives this notification signal, without waiting for a completion of the image process on subsequent printing face P1, the printing control unit outputs the image data of prior printing face P2 to printing unit 12 (vi).

When the output of prior printing face P2 is completed, a free space for the image data is secured in video buffer 432.

After that, the image process on subsequent printing face P1 is advanced, and the image data of subsequent printing face P1 is transferred in the created free space to video buffer 432, so that the printing process can be continued. At this time, as illustrated in (vii) of FIG. 6, at a timing when the output of prior printing face P2 is completed, a state is established in which only the image data of subsequent printing face P1 is stored in video buffer 432. In this case, by activating the timer along with detecting the occurrence of the memory full state as described above with respect to simplex printing, it is possible to monitor the occurrence of the memory full error with regard to the image data of subsequent printing face P1.

After the image data of the subsequent printing face is output in the above-mentioned manner, it is also possible to return to the original duplex printing control.

As described above, with the image forming apparatus according to the present embodiment, the printing process can proceed prior to the occurrence of the memory full state during duplex printing.

Also, since free space can be created in video buffer 432 while the output of the image data that can be output in the above-mentioned manner proceeds, the state of the memory full state is cancelled, and the printing process can be stably continued.

In particular, at the time of the high-speed duplex printing, as the number of pages of the preceding image process is larger, it is more likely that the memory full error occurs, and therefore it is possible to effectively avoid the stop of the printing process.

As described above, with the image forming apparatus according to the embodiment of the present disclosure, the normal duplex printing control, the high-speed duplex printing control, and the output control of the prior printing face related to the duplex printing can be appropriately and also smoothly shifted in accordance with a mode of the job.

In the above, the image forming apparatus according to the present disclosure has been described by way of embodiments, but the image forming apparatus according to the present disclosure is not limited to the above-mentioned embodiments, and various modifications and alterations can of course be made within the scope of the present disclosure.

For example, the memory full detection unit may determine a state in which all the subject units of the rendering data obtained while the rendering processing unit performs the rendering process on the printing data corresponding to the job is stored in the rendering buffer at the completion of the rendering process on the subject units of the job. In this case, in actuality, when all the subject units of the rendering data are stored in the rendering buffer, the first condition is satisfied.

Also, described above is a color-compatible image forming apparatus as an example according to the above-mentioned embodiments, but the present disclosure can also be applied to a monochrome-based image forming apparatus.

Furthermore, an optional memory may be further installed in the video buffer. For example, the area of the video buffer may be increased by changing the allocation with respect to an area used for another purpose such as a sort memory.

With this configuration, not only can the occurrence of the memory full error be avoided, but also the performance of the entire image forming apparatus can be improved.

It should be understood that various changes and modifications to the presently embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. An image forming apparatus comprising:
    a rendering processing unit configured to generate rendering data by sequentially performing a rendering process on one or more units of printing data corresponding to a received job and store the rendering data in a first storage area, wherein a unit of printing data comprises a page;
    an image processing unit configured to generate image data by sequentially performing an image process on one or more units of rendering data stored in the first storage area and store the image data in a second storage area, wherein a unit of rendering data comprises a page;
    an output control unit configured to output the image data stored in the second storage area in a specific order; and
    a memory full detection unit configured to detect, in a case where the output of subject units of the image data is not completed even when a specific period of time elapses since a state is established in which the rendering process on the subject units of the job is completed and also only a part or all of the subject units of the image data are stored in the second storage area, that a storage amount of the image data in the second storage area exceeds an acceptable amount.

2. The image forming apparatus according to claim 1, wherein in a case where the rendering process on the subject units of the job is completed and also the output of the subject units of the image data is not completed even when the specific period of time elapses since only at least a part of the subject units of the image data are stored in the second storage area, the memory full detection unit is configured to detect that the storage amount of the image data in the second storage area exceeds the acceptable amount.

3. The image forming apparatus according to claim 1, wherein in a case where the image data output by the output control unit is output through a simplex printing, the memory full detection unit is configured to detect that the storage amount of the image data in the second storage area exceeds the acceptable amount while the subject unit is set as one page.

4. The image forming apparatus according to claim 1, wherein in a case where the image data output by the output control unit is output through a duplex printing, the memory full detection unit is configured to detect that the storage amount of the image data in the second storage area exceeds the acceptable amount while the subject unit is set as two pages related to a prior printing face and a subsequent printing face.

5. The image forming apparatus according to claim 4, wherein in a case where the rendering process on the subject units of the job is completed and also the output of the image data of the prior printing face and the subsequent printing face is not completed even when the specific period of time elapses since only the image data of the prior printing face is stored in the second storage area, the memory full detection unit is configured to detect that the storage amount of the image data in the second storage area exceeds the acceptable amount.

6. The image forming apparatus according to claim 5, wherein the output control unit is configured to output the image data of the prior printing face and the subsequent printing face after all the image data of the prior printing face and the subsequent printing face is stored in the second storage area.

7. The image forming apparatus according to claim 5, wherein in a case where it is detected that the storage amount of the image data in the second storage area exceeds the acceptable amount, even if the image data of the subsequent printing face is not stored in the second storage area, the output control unit is configured to output the image data of the prior printing face.

8. The image forming apparatus according to claim 1, wherein the memory full detection unit is configured to determine a state in which all the subject units of the rendering data are stored in the first storage area at a completion of the rendering process on the subject units of the job.

9. A non-transitory computer-readable recording medium storing an image forming program executed by a computer of an image forming apparatus, the image forming program comprising:
a first program code that causes the computer to generate rendering data by sequentially performing a rendering process on one or more units of printing data corresponding to a received job in units of page and store the rendering data in a first storage area, wherein a unit of printing data comprises a page;
a second program code that causes the computer to generate image data by sequentially performing an image process on one or more units of rendering data stored in the first storage area in the units of page and store the image data in a second storage area, wherein a unit of rendering data comprises a page;
a third program code that causes the computer to output the image data stored in the second storage area in a specific order; and
a fourth program code that causes the computer to detect, in a case where the output of subject units of the image data is not completed even when a specific period of time elapses since a state is established in which the rendering process on the subject units of the job is completed and also only a part or all of the subject units of the image data are stored in the second storage area, that a storage amount of the image data in the second storage area exceeds an acceptable amount.

10. The non-transitory computer-readable recording medium according to claim 9, wherein the fourth program code causes the computer to detect, in a case where the rendering process on the subject units of the job is completed and also the output of the subject units of the image data is not completed even when the specific period of time elapses since only at least a part of the subject units of the image data are stored in the second storage area, that the storage amount of the image data in the second storage area exceeds the acceptable amount.

11. The non-transitory computer-readable recording medium according to claim 9, wherein the fourth program code causes the computer to detect, in a case where the image data output by the output control unit is output through a simplex printing, that the storage amount of the image data in the second storage area exceeds the acceptable amount while the subject unit is set as one page.

12. The non-transitory computer-readable recording medium according to claim 9, wherein the fourth program code causes the computer to (i) detect, in a case where the image data output by the output control unit is output through a duplex printing, that the storage amount of the image data in the second storage area exceeds the acceptable amount while the subject unit is set as two pages related to a prior printing face and a subsequent printing face and (ii) detect, in a case where the rendering process on the subject units of the job is completed and also the output of the image data of the prior printing face and the subsequent printing face is not completed even when the specific period of time elapses since only the image data of the prior printing face is stored in the second storage area, that the storage amount of the image data in the second storage area exceeds the acceptable amount, and
wherein the third program code causes the computer to, (i) output, after all the image data of the prior printing face and the subsequent printing face is stored in the second storage area, the image data of the prior printing face and the subsequent printing face and (ii) output, in a case where it is detected that the storage amount of the image data in the second storage area exceeds the acceptable amount, even if the image data of the subsequent printing face is not stored in the second storage area, the image data of the prior printing face.

13. The non-transitory computer-readable recording medium according to claim 9, wherein the fourth program code causes the computer to determine a state in which all the subject units of the rendering data are stored in the first storage area at a completion of the rendering process on the subject units of the job.

14. An image forming method, comprising:
generating, via a rendering processing unit, rendering data by sequentially performing a rendering process on one or more units of printing data corresponding to a received job in units of page and storing the rendering data in a first storage area, wherein a unit of printing data comprises a page;

generating, via an image processing unit, image data by sequentially performing an image process on one or more units of rendering data stored in the first storage area in the units of page and storing the image data in a second storage area, wherein a unit of rendering data comprises a page;

outputting, via an output control unit, the image data stored in the second storage area in a specific order: and detecting, via a memory full detection unit, in a case where the output of subject units of the image data is not completed even when a specific period of time elapses since a state is established in which the rendering process on the subject units of the job is completed and also only a part or all of the subject units of the image data are stored in the second storage area, that the storage amount of the image data in the second storage area exceeds the acceptable amount.

15. The image forming method according to claim 14, wherein in a case where the rendering process on the subject units of the job is completed and also the output of the subject units of the image data is not completed even when the specific period of time elapses since only at least a part of the subject units of the image data are stored in the second storage area, the memory full detection unit detects that the storage amount of the image data in the second storage area exceeds the acceptable amount.

16. The image forming method according to claim 14, wherein in a case where the image data output by the output control unit is output through a simplex printing, the memory full detection unit detects that the storage amount of the image data in the second storage area exceeds the acceptable amount while the subject unit is set as one page.

17. The image forming method according to claim 14, wherein the memory full detection unit (i) detects, in a case where the image data output by the output control unit is output through a duplex printing, that the storage amount of the image data in the second storage area exceeds the acceptable amount while the subject unit is set as two pages related to a prior printing face and a subsequent printing face and (ii) detects, in a case where the rendering process on the subject units of the job is completed and also the output of the image data of the prior printing face and the subsequent printing face is not completed even when the specific period of time elapses since only the image data of the prior printing face is stored in the second storage area, that the storage amount of the image data in the second storage area exceeds the acceptable amount, and wherein the output control unit (i) outputs, after all the image data of the prior printing face and the subsequent printing face is stored in the second storage area, the image data of the prior printing face and the subsequent printing face and (ii) outputs, in a case where it is detected that the storage amount of the image data in the second storage area exceeds the acceptable amount, even if the image data of the subsequent printing face is not stored in the second storage area, the image data of the prior printing face.

18. The image forming method according to claim 14, wherein the memory full detection unit determines a state in which all the subject units of the rendering data are stored in the first storage area at a completion of the rendering process on the subject units of the job.

\* \* \* \* \*